Feb. 6, 1940.   A. H. ANDERSON ET AL   2,188,994
APPARATUS FOR AUTOMATICALLY MAKING AND ASSEMBLING FILING CARDS
Filed Nov. 18, 1938   7 Sheets-Sheet 1

Inventors
A. H. ANDERSON, J. A. FITCH,
C. W. STRAUBEL,
By
Attorneys

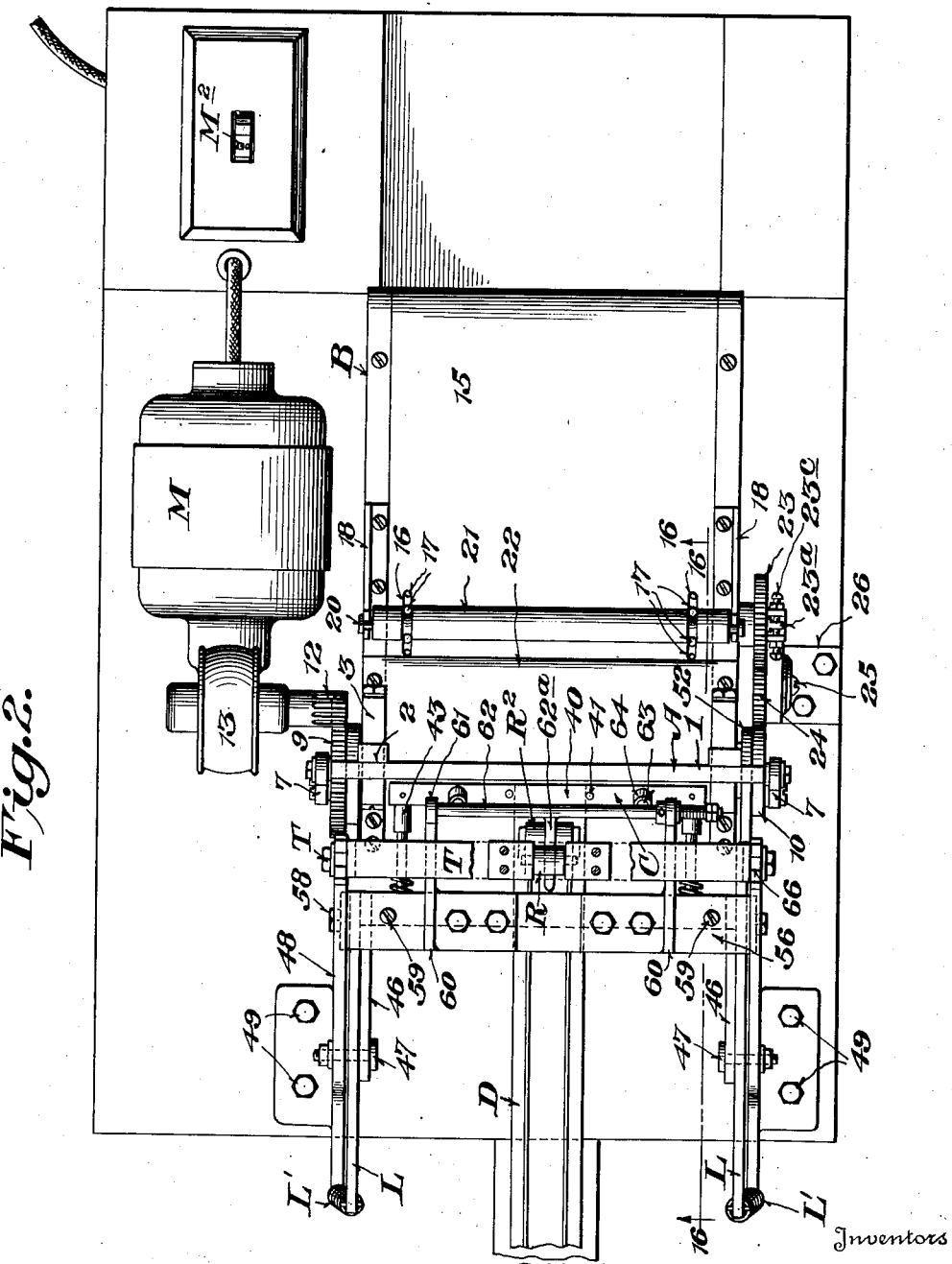

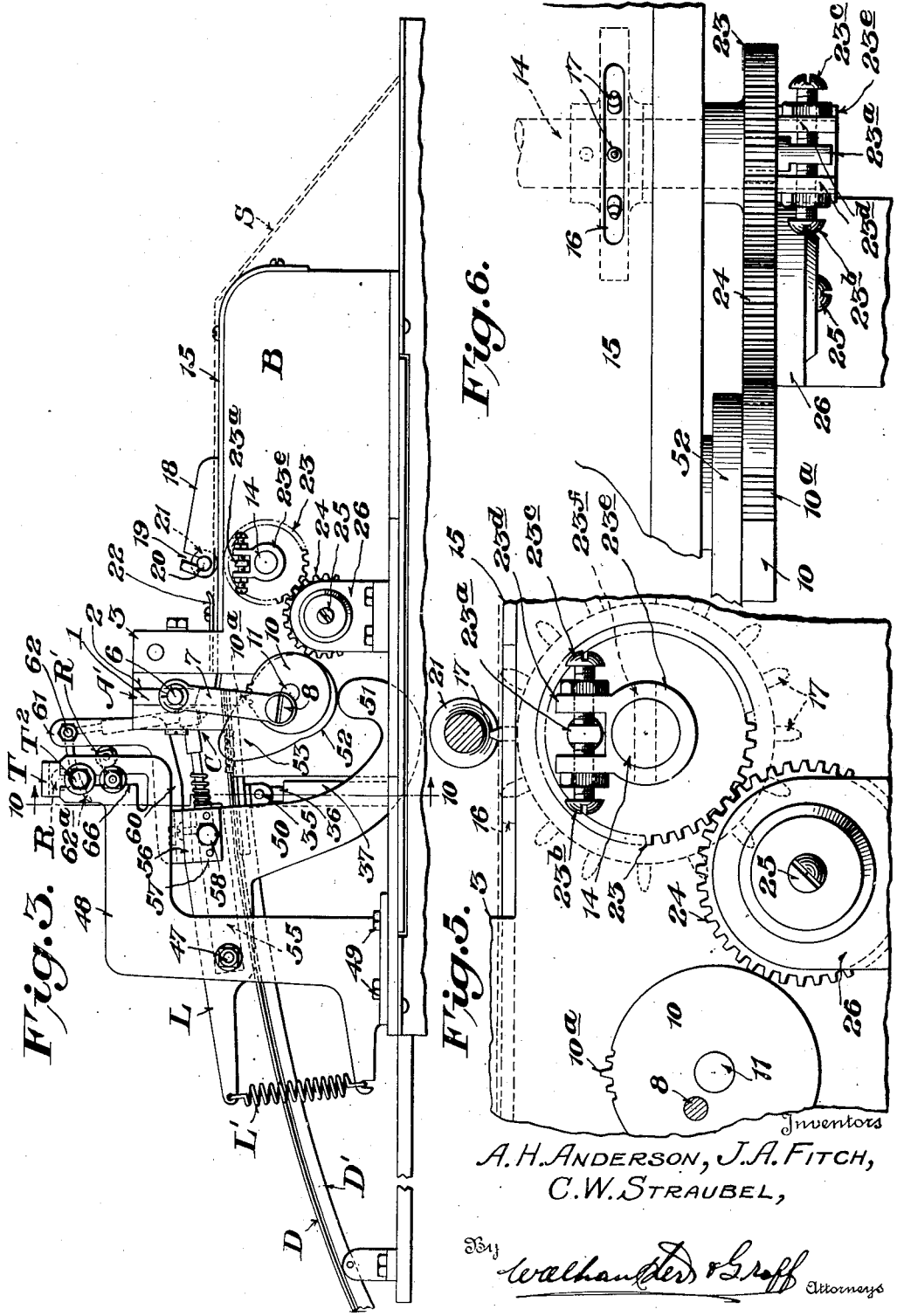

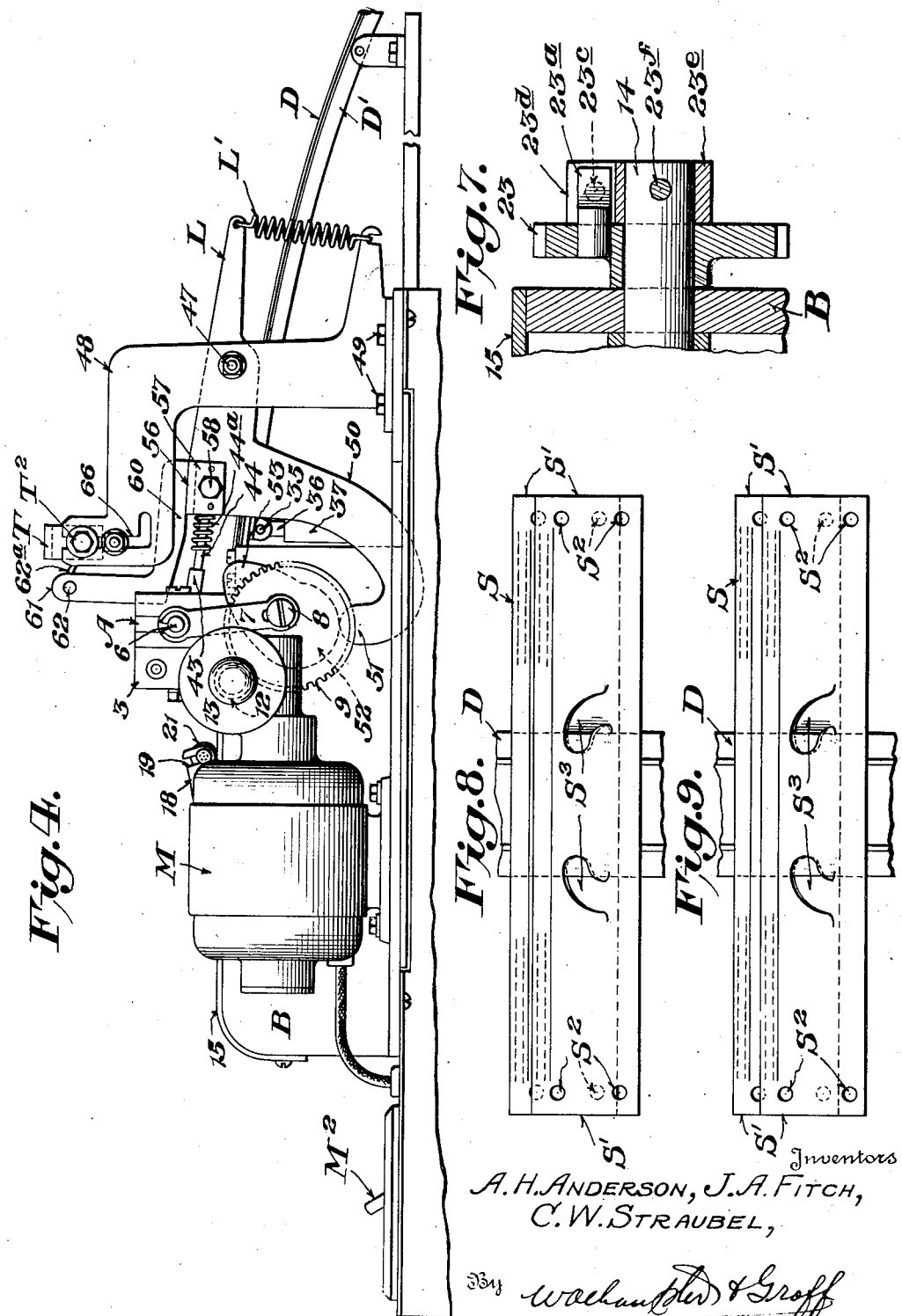

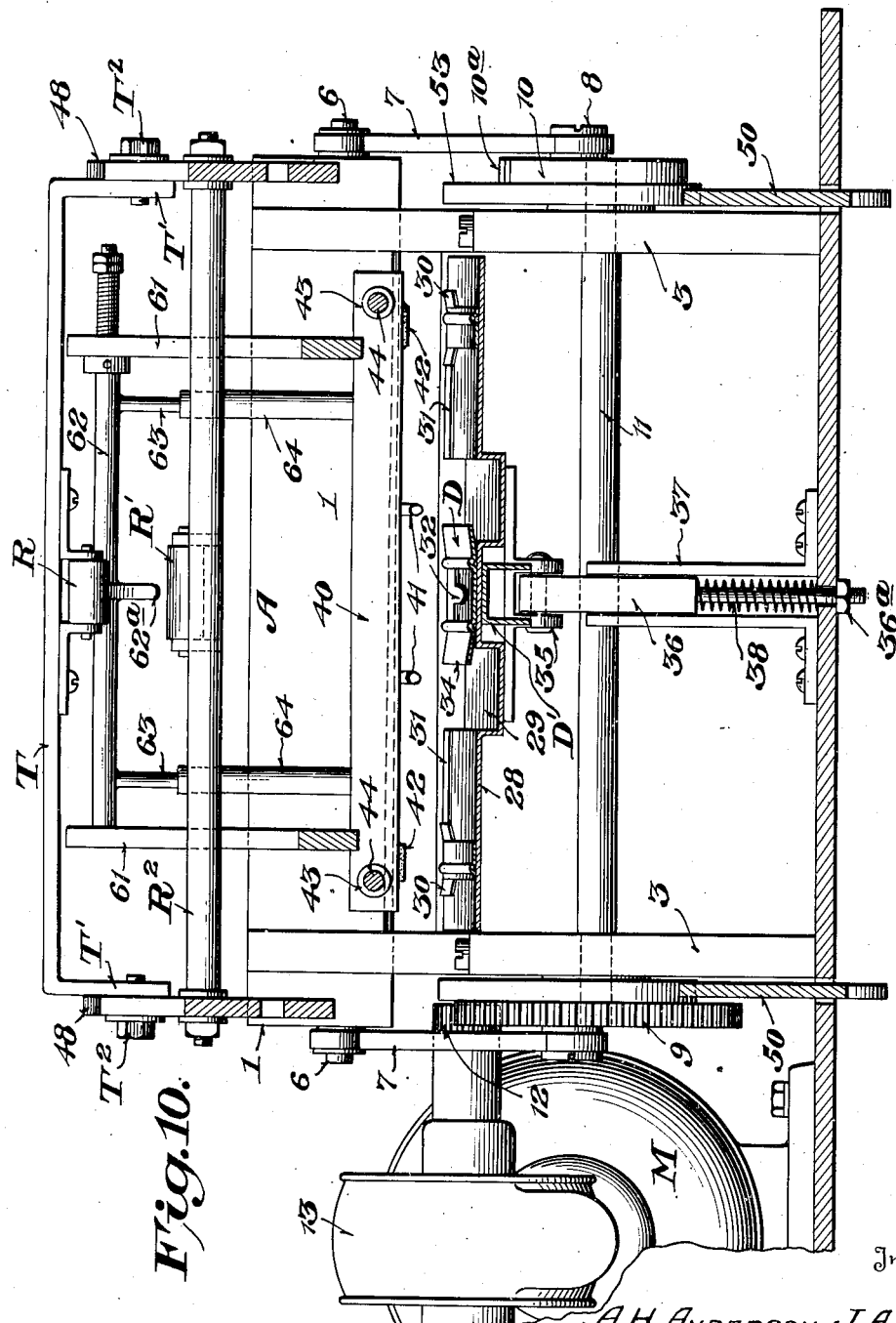

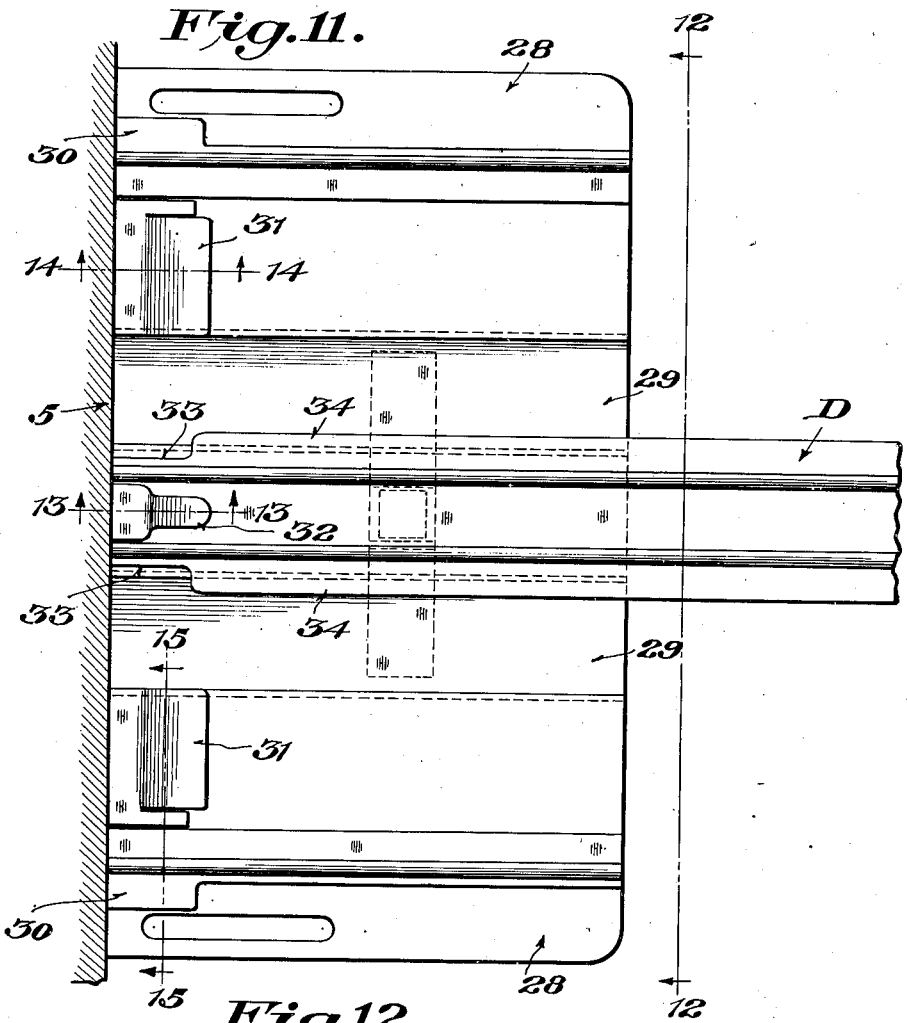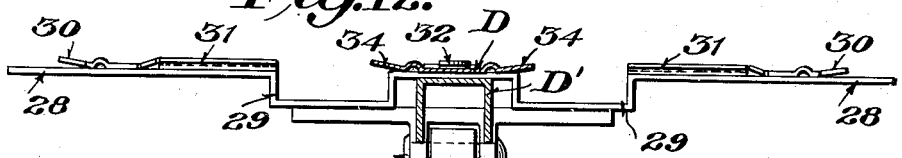

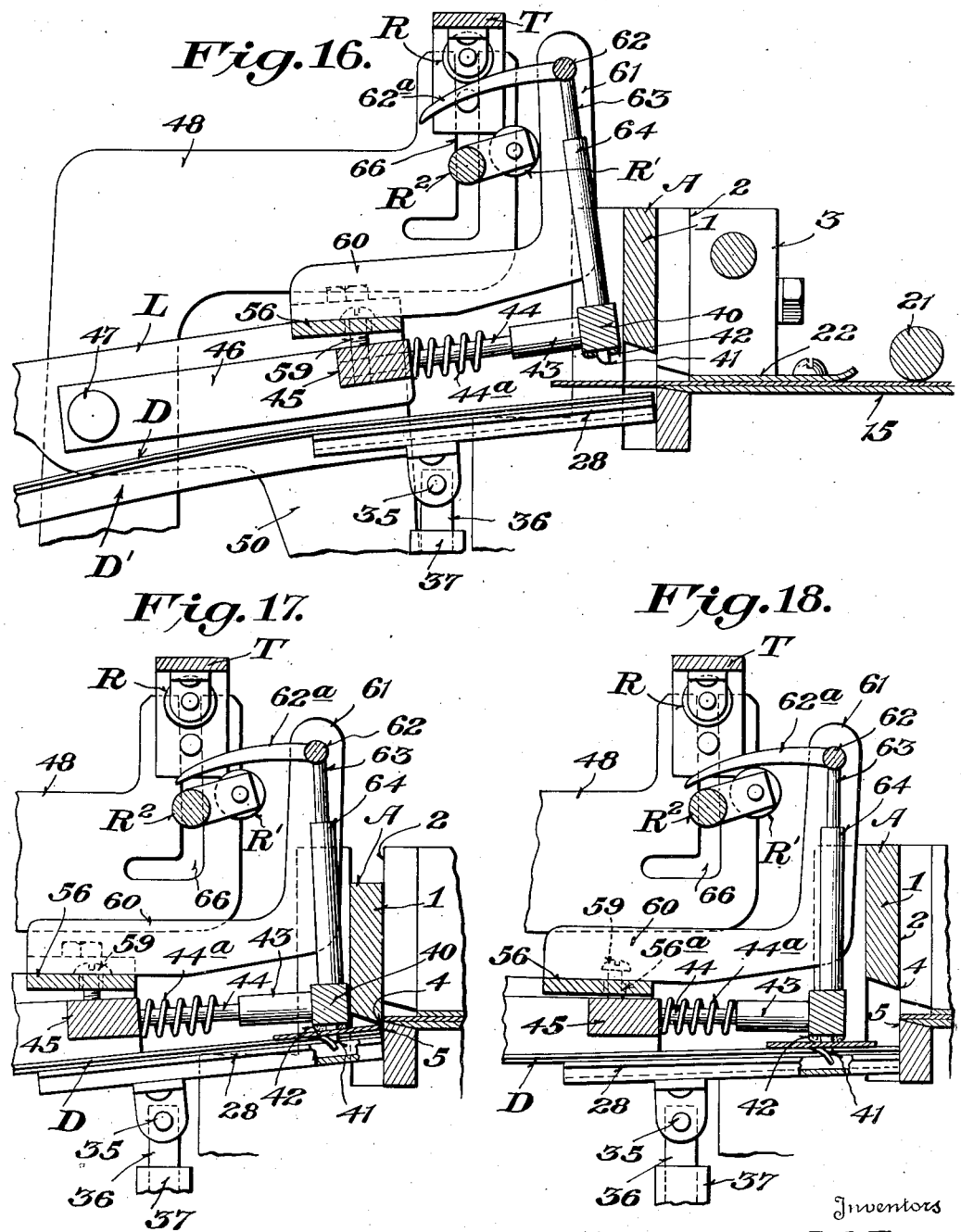

Patented Feb. 6, 1940

2,188,994

UNITED STATES PATENT OFFICE 2,188,994

APPARATUS FOR AUTOMATICALLY MAKING AND ASSEMBLING FILING CARDS

Alfred H. Anderson, Jason A. Fitch, and Clarence W. Straubel, Youngstown, Ohio, assignors, by mesne assignments, to Acme Visible Records, Inc., Chicago, Ill., a corporation of Delaware Application November 18, 1938, Serial No. 241,292

16 Claims. (Cl. 164—49)

This invention relates to an apparatus for making filling cards from a continuous strip and simultaneously assembling them in such a way that they are ready to be transferred in groups on card filing devices of the type shown in Straubel Patents No. 2,093,941, September 21, 1937 and No. 2,101,963, December 14, 1937.

Card filing systems employing devices of the type above referred to, permit of filling many cards for index and record purposes in a minimum of space, and, therefore, make it possible to obtain maximum card storage capacity in a given space, while at the same time making the cards quickly and conveniently available. Heretofore, it has been the general practice to use separate previously made cards which are singly placed on the card carried or runway by hand. This necessitates handling a plurality of individual cards for the purpose of making records thereon, one at a time, and likewise, assembling them in single order, on the card carrier or runway. While this practice is satisfactory in small offices, or other business establishments where it is not necessary to handle a large volume of cards, nevertheless, it is far too slow where the number of cards to be used run into the thousands and perhaps millions.

Accordingly, a primary object of the invention is to provide an apparatus permitting a new departure from the practice heretofore followed in the handling of individual cards, and provide an apparatus or machine for automatically making and assembling cards from a continuous strip of card forming material. This strip may be first printed or typed in any business machine of the class which prints or posts names, addresses, and other data, on a moving strip in a given sequence or order, and then such strip is fed into the present machine to be rapidly cut or severed into individual cards which are immediately impaled, threaded, or attached, as well as moved, in the same in the order in which they are cut from the strip, onto a collector or card carrier. From this support or carrier the cards may be transferred in the order in which they are assembled onto separate card carriers of the type shown in the patents above referred to for storage or further handling. Having these ends in view it is proposed to provide a cutter, synchronized with strip stock feeding means and individual card engaging and shifting means, all of which are so interconnected and timed that the individual cards may be produced and assembled with power driven speed and accuracy, thus making it possible to cut and assemble as many as four to six thousand cards per hour depending upon the speed of the motor which operates the mechanism.

In addition to the foregoing general object, the invention also contemplates means for adjusting the stroke of the feeding means so as to vary the margin of visibility on the individual cards as they are automatically impaled or threaded on the support or carrier. This is an important feature of the machine inasmuch as it enables the cards to be cut so that when they are assembled on the carrier only sufficient margin will be visible on each card to show a single line of type, thereby wasting no space for margin visibility and consequently materially increasing the number of cards which may be assembled or threaded onto a single card carrier of a given index device. On the other hand, if it is desired to provide a card having a margin of sufficient width to expose, for example, two lines of type, the present machine provides for that contingency through making a simple adjustment of the feeding means without affecting the adjustment or setting of any of the other corelated and synchronously operating parts.

A further object of the invention is to provide a cutter and a novel depressible and oscillatable card impaling and delivery mechanism which quickly and accurately impales or threads the cards on the special card collector or carrier forming a part of the machine, and, at the same time, moves or advances each card as it is cut, to a position clear of the point where it is cut, to thereby handle the next card delivered at the fall side of the cutter.

Other and more specific objects of the invention will appear as the nature of the invention is better understood and the same consists in the novel construction, combination and arrangement of parts hereinafter more fully illustrated, described and claimed.

A preferred and practical embodiment of the invention is shown in the accompanying drawings, in which:

Figure 2 is a top plan view thereof.

Figure 3 is an elevation of one side of the machine.

Figure 4 is an elevation of the side of the machine opposite that shown in Figure 3.

Figure 5 is an enlarged detail view of the means employed for varying the margin of visibility on the cards.

Figure 6 is an enlarged detail plan view of the construction shown in Figure 5.

Figure 7 is a vertical sectional view taken on the line 7—7 of Figure 5.

Figure 8 is a detail view showing several of the cards mounted on the card collector and having a minimum margin of visibility.

Figure 9 is a view similar to Fig. 8 illustrating individual cards made with a wider margin of visibility.

Figure 10 is a vertical cross sectional view taken on the line 10—10 of Fig. 3.

Figure 11 is a detail top plan view of the yielding platform which supports the card collector.

Figure 12 is a horizontal cross-sectional view taken on the line 12—12 of Fig. 11.

Figure 13 is a detail cross-sectional view taken on the line 13—13 of Fig. 11.

Figure 14 is a detail sectional view taken on the line 14—14 of Fig. 11.

Figure 15 is a detail sectional view taken on the line 15—15 of Fig. 11.

Figure 16 is a detail vertical sectional view taken on the line 16—16 of Fig. 2.

Figures 17 and 18 are diagrammatic sectional views illustrating the parts shown in Fig. 16 in their relative positions during the impaling and feeding movement of the card engaging head.

Similar reference characters designate corresponding parts throughout the several figures of the drawings.

Figure 1:
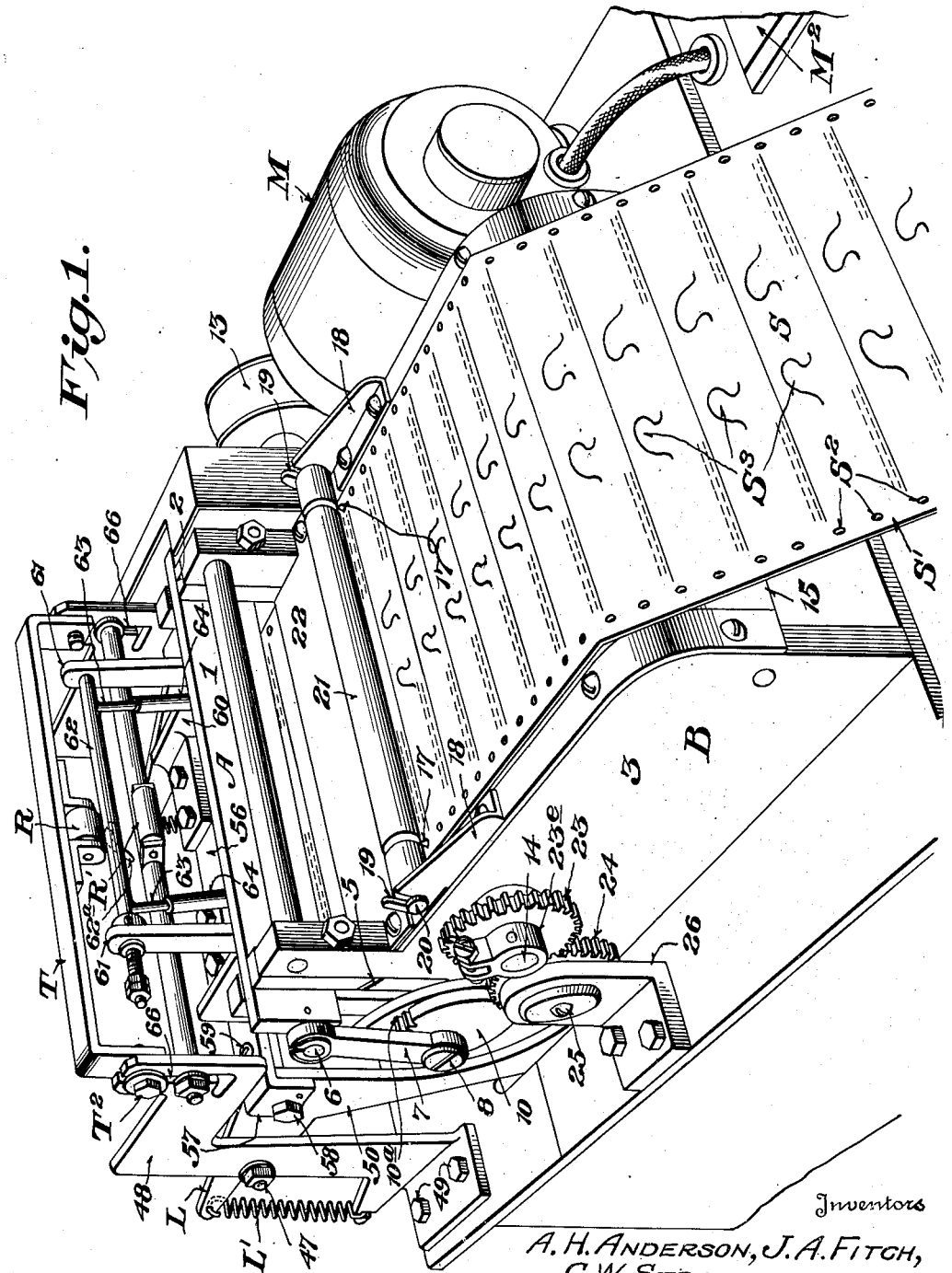
Figure 1 is a perspective view of the apparatus embodying the present invention.

The present apparatus includes in its organization cutting means designated generally as A, strip feeding means B; and oscillatable and depressible impaling and delivering means identified generally as C for pushing the cards as they are made by the cutter onto a collecting and gathering support, preferably in the form of an elongated runway D. The said instrumentalities A, B and C are co-ordinated for synchronous movement so that the continuous strip S, of card material, may be intermittently advanced toward the cutting means A by the feeding means B while the card impaling and delivering means C is impaling or threading the individual cards on the support D as fast as they are dropped from the fall side of the cutter.

*Continuous card strip*

Before proceeding to a detail description of the several component units of the apparatus, above identified, it may be observed (Fig. 1) that the continuous strip S may be, for example, of the type having the perforated marginal portions S' provided with perforations $S^2$, and also having its intermediate portion formed at suitable longitudinally spaced intervals with the die-cut support engaging ears $S^3$. In practice, the continuous strip S is usually passed through a machine for printing names or other data at the upper edge and/or elsewhere thereof, so that when the continuous strip is brought to the present apparatus it is ready to be cut up into individual cards. It will, of course, be understood that it is within the scope of the invention to employ other forms of continuous strip stock from which the cards may be formed, since the present invention is particularly concerned with an apparatus which will quickly and conveniently make and collect the cards in such a way that they may be transferred to a suitable card filing device with a minimum of time and effort.

*Cutting means*

The cutting means (Figs. 1–3, 16, 17, 18) designated generally as A includes a cutting blade 1 of the guillotine type slidably mounted for vertical movement in the vertical guides 2—2 of the opposite frame portions or side walls 3—3 of the machine. The lower edge of the blade is, of course, provided with a cutting edge 4 cooperating with a ledger blade 5 arranged transversely of the frame members 3—3. It will also be observed from the drawings that the opposite ends of the cutter bar 1 are each provided with laterally extending journal pins 6 connected through the links 7 with pivots 8 eccentrically mounted on the gears 9 and 10 carried by opposite ends of a main drive shaft 11. This shaft extends transversely of the machine between the side walls 3—3, and as will be observed from Figures 1 and 2 the gear 9 at one end of the shaft is formed with continuous gear teeth while the gear 10 at the other end is of the mutilated type for operating the feeding mechanism B as will later appear.

The gear 9 of the main power shaft 11 is driven by a gear 12 forming part of a speed-reducing train operated by an electric motor M which may be connected and disconnected with a source of current supply by the operators control switch $M^2$.

It will thus be apparent that when current is supplied to the motor M the gears 9 and 10 driven from the main shaft 11 move the links 7—7 to impart a vertical reciprocating motion to the cutter blade 1 relative to the fixed blade 5.

*Card strip feeding means*

The feeding means B may be of any well known type adapted to continuously and yet intermittently advance the strip to the cutter. In the example shown, having due regard to the type of continuous strip S previously described, the said feeding means includes a shaft 14 journaled in the side walls 3—3 and located below an apron or platen 15 over which the strip is adapted to be moved. The said apron 15 is provided with openings 16 for permitting the teeth of feeding sprockets 17, carried by the shaft 14, to engage the perforations $S^2$ in the continuous card strip S.

With further reference to the apron 15 over which the continuous strip is fed to the cutter 1 it may be observed that there is provided at opposite sides of the apron suitable cradle members 18 having slots 19 for loosely receiving the reduced end portions 20 of a floating guide and presser roller 21. This roller is grooved where it overlies the sprockets 17 and assists in keeping the card strip close to the apron, as well as realigning any of the die cut ears $S^3$ with the body of the strip in the event that they have been slightly distorted or displaced in moving over the leading edge of the apron as the strip is fed from stock. The apron 15 is also provided between the roller and the cutter, with a suitable plate 22 forming a throat through which the strip is fed to the cutter.

Referring again to the shaft 14 which carries the pin type sprockets 17, it may be pointed out that this shaft is intermittently operated by power supplied from the main shaft 11. That is to say, the shaft 14 is provided with a gear 23 located at the side of the machine opposite the motor M, the said gear 23 meshing with an idler gear 24 pivotally supported as at 25 in a bracket 26, and adapted to be engaged at predetermined intervals by the tooth $10^a$ of the mutilated gear 10. It will thus be apparent that continuous rotary movement of the shaft 11 imparted thereto by the motor M is translated into intermittent movement, so far as the strip feeding shaft 14 is concerned, through the medium of the mutilated gear 10 and its tooth 10ª. For each revolution of the gear 10, the gears 23 and 24 move the continuous strip one card length to and between the cutting edges 4 and 5 of the cutting means.

In connection with the strip feeding mechanism just described, it is one of the features of the present apparatus that the margin of visibility of the overlapped cards threaded onto the collector D may be varied within certain limits to provide more or less visible space at the top of the cards when they are stacked or assembled. In other words, the depth of the cards may be varied by altering or adjusting the strip feeding means.

As will be apparent from Figs. 5, 6 and 7, the driven gear 23 is free on the shaft 14. This gear is provided with a laterally extending driving pin 23ª adapted to be engaged by the inner ends of adjusting screws 23ᵇ and 23ᶜ mounted in the spaced yoke portions 23ᵈ of a collar 23ᵉ keyed to the shaft 14 by a pin 23ᶠ.

With the foregoing arrangement, if it is desired to increase the margin of visibility on the cards, it is only necessary to back off screw 23ᶜ and advance screw 23ᵇ, while, on the other hand, if it is desired to decrease the margin of visibility on the cards, it is only necessary to back off the screw 23ᵇ and advance the screw 23ᶜ.

In connection with the mutilated gear 10 it may be observed that the same is provided with only one full tooth and two part teeth; and, in connection with the idler gear 24, it may be noted that every other pair of teeth are cut back to clear the teeth 10ª of the drive gear 10.

In any event, after the screws 23ᵇ and 23ᶜ have been set in the desired position, it will be apparent that rotation of the mutilated gear 10ª will impart intermittent motion to the idler 24 meshing with the gear 23 which drives the shaft 14 to feed the strip stock to the cutter.

*Means for threading individual cards on card collector*

The means for handling the cards after they have been severed from the continuous strip by the cutter, and designated generally as C, includes a suitable table or platform 28 (Figs. 11-15) on which the card collector D is mounted. This platform 28, according to the present embodiment, is in the form of a piece of sheet metal extending across the machine between the inner faces of the side walls 3—3 thereof, and provided with the depressed clearances 29 arranged at opposite sides of a medial portion 30 to which the card collector D is attached. The front edge of the platform 28 is substantially in contact with the stationary blade 5 of the cutter means, while the rear edge is so arranged as to provide sufficient depth to the platform to enable the proper threading of the previously die cut ears S³ of the cards onto the collector D. The front edge of the platform is provided with a plurality of pairs of spring clips 30—30 and 31—31, the rear ends of the clips being bent upwardly as will be apparent from Figs. 11 and 14 to prevent the cards sliding backwards. Likewise, the forward end of the collector D is provided with a spring clip 32, medially thereof, for the same purpose. The side edges of the card carrier are cut away as indicated at 33 to provide sufficient clearance to permit the ears S³ of the cards being depressed so that they may be engaged beneath the side flanges 34—34 of the card carrier as will presently appear.

The platform 28 is provided at its underside with a suitable channel member 35 for pivotally connecting the table to a yieldingly mounted supporting post 36. This post is guided in a tubular member 37 which houses a spring 38 tending to urge the post 36 upwardly to its normal position. The lower end of the post 36 may be reduced in diameter and pass through an opening in the bed of the machine as shown in Fig. 10, to receive a nut 36ª which will serve as a stop to limit the upward movement of the platform under the influence of the spring 38.

It will, therefore, be apparent that the platform 28 is yieldingly mounted. Such a mounting is desirable to permit of absorbing the impact incident to threading or impaling the individual cards on the card collector D.

Suspended above the front edge of the platform 28, and adjacent the rear side of the vertically reciprocating cutting blade 1, there is provided a card impaling and shifting head 40. This head extends across the machine for the full width of the card strip, and is mounted to have both a substantially vertical and oscillatable movement. In other words, the head 40 is mounted to have a compound movement, that is, both vertically and horizontally. The result of downward substantially vertical movement is to depress the ears S³ of the individual cards simultaneously so that they will be placed in a position to engage beneath the flanges 34 of the card collector, while the rearward horizontal movement is intended to push, pull, or otherwise propel each card toward the end of the card collector D.

To accomplish the above functions it may be pointed out that the head 40 is provided at its underside with a pair of spaced lugs (Fig. 10) at substantially the medial portion thereof, the said lugs being so arranged as to engage the ears S³ of the individual cards and push them downwardly into the clearances 33 at each side of the card collector. Also, the bottom face of the head 40 is provided with rubber or equivalent pads 42 to engage the cards preparatory to shifting them horizontally onto the flange 34 of the card collector.

The head 40 is provided with the spaced rearwardly extending sleeves 43 telescopically receiving the rods 44 carried by a transverse bar 45 rigidly supported by a pair of rearwardly extending arms 46 which lie inside of and are mounted on the same pivots 47 as the primary actuating lever L; said pivots being in turn supported in the upright portions of suitable substantially right angular brackets 48. These brackets are secured to the bed of the machine as indicated at 49. The rods 44 are provided with coil springs 44ª for cushioning the rearward movement of the sleeves 44 of the head 40 as it feeds the cards onto the card collector.

The primary operating levers L are provided with the downwardly extending curved arms 50 each provided with an upturned nose 51. The rear ends of said actuating levers are connected to suitably anchored coil springs L' which tend to rock the said levers counter-clockwise on the pivots 47 thus causing the nose portions 51 to at all times engage the surface or contour of the cams 53 carried by the main actuating shaft 11 which furnishes power for the entire machine. It will thus be apparent that when the cams 53 are operated by the shaft 11 the primary actuating levers L will be first turned clockwise, or pushed down, against the tension of the springs L' to lower the head 40 and bring the lugs 41 into depressing engagement with the ears S³ of the card. When the head 40 descends with the forward ends of the levers L, as will more fully later appear, to impale the cards on the card collector, it will also slightly depress the platform 28, and, it will, of course, be understood that the configuration of the cams 53 is such that a uniform rocking movement is imparted to the levers L to produce a steady and continuous downward movement of the head 40 to effect the threading of the cards on the card carrier D.

The means for effecting the feeding movement of the head 40 will now be described, in connection with Figs. 10, 16, 17 and 18.

The bar 45, which rigidly carries the arms 44 lies beneath a transversely disposed strap 56 whose end portions are turned downwardly as indicated at 57 and bolted as at 58 to the levers L (see Fig. 3). The strap 56 is provided with a plurality of openings 56ª for loosely receiving the headed screws or their equivalent 59 whose lower ends are embedded in or engaged with the bar 45. The purpose of this arrangement is two fold, namely, to connect the bar 45 loosely with the strap carried by the levers L so that the bar will move with the levers; and also to permit of a relative movement between the bar 45 and the strap 56 to provide sufficient play or tolerance to insure the proper movement of the card engaging head 40 as it both descends and swings.

The strap 56 rigidly carries at its upper side, a plurality of substantially bell-crank shaped rigid arms 60 whose front upwardly extending portions 61 support a rock shaft 62 between them. This rock shaft is provided with the downwardly extending rods 63 which telescopically engage the tubular members 64 carried by the upper side of the head 40. It will thus be apparent that the head 40 may move up and down relative to the rock shaft 62.

The levers L connected by the strap 56 and the angular brackets 60—61 carried thereby provide in effect a rigid main actuating frame carrying the rock shaft 62, the primary function of this shaft being to shift the head 40 back and forth. The head 40 is directly and slidably carried by the parts 45 and 46 which also form a secondary frame, pivoted co-axially as at 47, with the levers L. Both frames are loosely connected by the screws 59 as aforesaid.

The said rock shaft is medially provided with a rearwardly extending cam 62ª (Figs. 16–18). This cam is of arcuate or curved formation and is intended to engage with upper and lower roller abutments R and R'. The upper roller abutment R is mounted on a spindle carried by a suitable bracket on the frame part T whose inner ends T' are bent downwardly, (Fig. 10) to receive suitable fastenings T² which are adjustable in slots 66 of the upwardly directed arm portions of the brackets 48.

The lower roller abutment R' is mounted on a spindle carried by arms extending from a transversely disposed rod or support R² whose opposite ends are also adjustably fitted in the slots 66, and locked in position by suitable nuts provided at the end of the rod.

It will thus be apparent that, as the head 40 is moved down, the cam 62ª carried by the rock shaft will strike the upper side of the lower roller R'. Thus the telescopically engaged members 63 and 64 controlled by the rock shaft 62 will swing to move the head 40 in a clockwise direction, that is, rearwardly, to move the card which has been impaled on the card collector further onto the flanges 34 thereof.

When the assembly including the bar 40 moves upwardly or ascends, it will be seen particularly from Fig. 16, that the cam 62ª will engage the underside of the upper roller R and turn the shaft 62 in a counter-clockwise direction and thus back to position to poise the head 40 for descent onto the next succeeding card.

From the foregoing it will be apparent that the card impaling and delivering means is actuated by cams 53 which rock the levers L on the pivots 47 thereby to impart up and down movement to the head 40 which is, in effect, a part of the primary actuating levers. Sufficient play is provided by the telescopic connections 63 and 64 to permit of the head 40 descending while accomplishing its substantially swinging or oscillating movement due to the cam 63 operating between the roller abutments R and R'.

*Operation*

When the switch M² is closed to operate the motor M, the main shaft 11 is set in motion. Consequently, the feeding means B will be operated through the gears 9—10, 24 and 23. The continuous strip S which has been threaded beneath the hold-down or presser roller and the guide means 22 above the apron will be intermittently fed between the cutting edges 4 and 5 of the cutting means. The movable shear or cutter blade 1 will be moved up and down, through the medium of the links 7 which are connected respectively with the gears 9 and 10, to sever the card. Meanwhile, the cam 53 which is in engagement with the nose 51 of the lever arms 50 of the main actuating levers L will set the card impaling and advancing head 40 in motion. The head moves down toward the card which has just been sheared or cut so that the lugs 41 thereof depress the ears S³ forcing them through the clearances 33 of the card collector and then as the head 40 approaches its lower limit of movement the cam 62ª strikes the lower roller abutment R' and swings the head 40 rearwardly. During this portion of the movement the sleeves 43 pass over the rods 44 into engagement with the spring 44ª to cushion this portion of the stroke of the head. As soon as the rearward movement of the head is completed due to the dwell of the cams 53 leaving the nose portions 51 of the levers L, the springs L' will tend to rock the forward end of the said levers upwardly and consequently move the cam 62ª toward the upper roller abutment R thus rocking the head 40 back to its normal poised position, ready for the next operation.

The present apparatus provides means for quickly and accurately assembling cards on the elongated card collector D supported partially by the rearwardly extending tail piece D' which, in effect forms a part of the platform 28. As the cards are advanced toward the end of the collector an operator may insert a card carrier of the type shown in the patents referred to herein, between the ears S³ of the cards and thus take off or transfer any number or group of cards directly to the card carrier or runway which is to be hung on a panel and placed in a storage drawer or other compartment.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

We claim:

1. An apparatus for automatically making and assembling individual filing cards from a continuous strip, comprising, a cutter for severing individual cards from the strip, intermittently operating feeding means for advancing the strip by successive strokes to the cutter, means for varying the stroke of the feeding means to vary the length of the cards, a card collector at the fall side of the cutter, and means synchronized with the cutter for advancing the several cards along the collector.

2. An apparatus for automatically making and assembling individual filing cards from a continuous strip provided with pre-cut support engaging ears, comprising, a cutter for successively severing the cards from the strip, strip feeding means for advancing the strip to the cutter, a card collector in rear of the cutter, and means synchronized with the cutter for simultaneously flexing the said ears into engagement with the collector and moving the card made by the cutter along said collector.

3. An apparatus for automatically making and assembling individual filing cards from a continuous strip provided with pre-cut support engaging ears, comprising, a main drive shaft, a cutter operated by said drive shaft and successively severing the cards from the strip, strip feeding means for advancing the strip to the cutter, means operated by said drive shaft for intermittently advancing the strip to the cutter, a card collector in rear of the cutter, and means synchronized with the cutter for simultaneously flexing said ears into engagement with the collector and moving the card made by the cutter along said collector.

4. An apparatus for automatically making and assembling individual filing cards from a continuous strip provided with pre-cut support engaging ears, comprising, a main drive shaft, a cutter operated by said drive shaft for successively severing the cards from the strip, strip feeding means for advancing the strip to the cutter, means operated by said drive shaft for intermittently advancing the strip to the cutter, said means including adjustable means for selectively varying the intermittent stroke of said feeding means, a card collector in rear of the cutter, and means synchronized with the cutter for simultaneously flexing said ears into engagement with the collector and moving the card made by the cutter along said collector.

5. An apparatus for making individual filing cards from continuous stock and assembling them in filing relation, comprising, cutting means for successively severing the cards from the stock, a strip at the fall side of the cutter for temporarily holding the severed cards, and means synchronized with the cutting means for flexing a portion of the severed cards into engagement with said strip and sliding the same therealong in overlapped relation.

6. An apparatus for automatically making and assembling individual filing cards from a continuous strip provided with pre-cut support engaging ears, comprising, cutting means, a card collector, strip feeding means including a shaft having wheels thereon for engaging the strip, a main drive shaft, connections between said drive shaft and the cutting means for reciprocating the same; gearing between said driven shaft and the shaft of the strip feeding means, said gearing including a mutilated gear on the drive shaft, an idler operated by said mutilated gear, a gear free on the shaft of the feeding means, a laterally projecting pin on said gear, a collar keyed to the shaft of the feeding means, means carried by the collar for adjustably engaging said pin, and means for impaling and feeding the severed cards on the collector.

7. An apparatus for automatically making and assembling filing cards from a continuous strip having pre-cut support engaging ears, comprising, cutting means, strip feeding means, a card collector, and means for impaling and advancing the severed cards on the collector, said last named means comprising a card engaging head having means on its underside for flexing the said ears of the card onto the collector and also having other means for frictionally engaging the cards, and means for imparting a downward and rearward movement to said head.

8. An apparatus for automatically making and assembling filing cards from a continuous strip having pre-cut support engaging ears, comprising, cutting means, strip feeding means, a card collector, and means for impaling and advancing the severed cards on the collector, said last named means comprising a card engaging head having spaced lugs on its underside arranged to substantially straddle the collector for flexing the said ears of the card onto the collector, and means for imparting a downward and rearward movement to said head.

9. An apparatus for automatically making and assembling filing cards from a continuous strip having pre-cut support engaging ears comprising, cutting means, strip feeding means, a card collector and means for impaling and advancing the severed cards on the collector, said last named means comprising a card engaging head arranged transversely of the path of movement of the cards and having spaced lugs on its underside for flexing the ears of the card onto the collector, lever means for lowering and raising said head relative to a card, and means disposed in the path of movement of said head and causing the same to move rearward and forward, respectively, as the head is lowered and raised.

10. An apparatus for automatically making and assembling filing cards from a continuous strip having pre-cut support engaging ears, comprising, cutting means, strip feeding means, a card collector, and means for impaling and advancing the severed cards on the collector, said last named means comprising a card engaging and feeding head, a main actuating frame, a secondary frame slidably supporting the head, a rock shaft carried by said main frame, a sliding connection between the rock shaft and the head, a cam carried by the rock shaft, and fixed spaced abutments adapted to be engaged by the cam as the actuating frame moves to swing the rock shaft.

11. An apparatus for automatically making and assembling filing cards from a continuous strip having pre-cut support engaging ears, comprising, cutting means, strip feeding means, a card collector, and means for impaling and advancing the severed cards on the collector, said last named means comprising a card engaging and feeding head, a pivotally mounted main actuating frame, a secondary frame pivoted coaxially at one end with the main frame and slidably supporting the head at the other end, a rock shaft carried by said main frame, a sliding connection between the rock shaft and the head, a cam carried by the rock shaft, and fixed spaced abutments adapted to be engaged by the cam as the actuating frame moves to swing the rock shaft.

12. An apparatus for automatically making and assembling filing cards from a continuous strip having pre-cut support engaging ears, comprising, cutting means, strip feeding means, a card collector, and means for impaling and advancing the severed cards on the collector, said last named means comprising a card engaging and feeding head, cam operated lever means for lowering and raising the head, and cam and lever means cooperating with fixed abutments on the apparatus for swinging the head as it is lowered and raised.

13. An apparatus for automatically making and assembling filing cards from a continuous strip having pre-cut support engaging ears, comprising, cutting means, strip feeding means, a card collector, and means for impaling and advancing the severed cards on the collector, said last named means comprising a card engaging head, a pivoted support for the head, horizontally extensible connections between the head and the support, a pair of primary actuating levers connected by a transverse strap and pivoted co-axially with the support, cam means for operating said levers, springs for urging said levers into engagement with the cam means, a lost motion connection between said support and strap, a rock shaft supported by said levers, substantially vertical extensible connections between said head and said rock shaft, a pair of spaced fixed abutments at one side of the rock shaft, a cam carried by the rock shaft and adapted alternately to engage said abutments as the actuating levers move up and down to impart a swinging movement to the card engaging head.

14. An apparatus for automatically making and assembling filing cards from a continuous strip having pre-cut support engaging ears, comprising, cutting means, strip feeding means, a card collector, means for impaling and advancing the severed cards on the collector, a yieldable platform supporting the collector, and means on the collector for preventing the backward movement of the cards.

15. An apparatus for automatically making and assembling filing cards from a continuous strip having pre-cut support engaging ears, comprising, cutting means, strip feeding means, a card collector, means for impaling and advancing the severed cards on the collector, a yieldable platform for supporting the collector and spring clips on the platform for preventing backward movement of the cards on the collector.

16. An apparatus for automatically making and assembling filing cards from a continuous strip having pre-cut support engaging ears, comprising, cutting means, strip feeding means, a card collector, means for impaling and advancing the severed cards on the collector, a yieldable platform for supporting the collector located at the fall side of the cutting means, a spring for supporting the platform means for defining the upward limit of movement of the platform under the influence of the spring, a support for the collector bar carried by said platform, and means for preventing backward movement of the cards on the collector.

ALFRED H. ANDERSON.
JASON A. FITCH.
CLARENCE W. STRAUBEL.